Inventor
Ralph A Morrison
By his Attorney

June 20, 1967  R. A. MORRISON  3,326,058
INDEXING MECHANISMS
Filed Dec. 9, 1965  5 Sheets-Sheet 5

United States Patent Office 3,326,058
Patented June 20, 1967

3,326,058
INDEXING MECHANISMS
Ralph A. Morrison, Topsfield, Mass., assignor to United Shoe Machinery Corporation, Boston, Mass., a corporation of New Jersey
Filed Dec. 9, 1965, Ser. No. 512,685
3 Claims. (Cl. 74—393)

The present invention relates to a motion producing means and more particularly to a mechanism for producing an intermittent motion or desired index at work stations.

The invention embodies novel means whereby continuous rotary motion is changed to intermittent rotary movement wherein the intermittent motion is positively and smoothly controlled at all times.

It is generally recognized that the indexing of high inertia parts at relatively high speeds requires integrity of motion based upon sound mathematical derivation and mechanical execution.

Mechanisms such as Genevas, crank and sliders, or any other device which kinematically introduces a finite acceleration to the driven mass at start and finish of the motion, are not acceptable because of the transient vibration, noise, magnification of loads, and wear which are introduced.

To impart a more desirable acceleration characteristic to the driven system, it follows that cam operated devices using the proper cam geometry should be, and have been, an improvement.

One type of mechanism in use today for achieving intermittent motion combines a spring, a cam, and a worm gear. The cam and its cam follower, which may well be stationary, comprise complementary surfaces and motion is achieved when the cam and follower move into and out of registry with each other, the spring being used to urge the cam members into the desired registry. The difficulty with the above mechanism is that it involves a great deal of friction between a moving cam and the follower and thereby produces wear upon the parts, such wear seriously affecting the desired motion. Any variance in the registry of the cam and follower has an adverse result in the accuracy of index at a work station. A jerky or jarring motion is produced that makes any critical control of the index impossible without the introduction of an exterior mechanism to key with the indexed device at the desired position and to prevent any further rotation until the key mechanism is released.

Another mechanism in use today involves the utilization of as many cam follower rolls on the index table as there are required index stations, with these rolls required to engage a barrel or globoidal type cam upon arrival at the cam position. Here, as is the case with Geneva motions, the elasticity of the index mechanism cam and parts, along with inescapable cam and cam roll placement errors, introduces an error of engagement that can be felt, heard, and measured as an undesirable amendment to the mathematically determined and desired motion.

In pursuit of a mechanism capable of continuous control in indexing through a wide range of index stations, the subject mechanism was invented. As is the case with all other mechanisms, this invention is not immune to material surface deformations or structural deflections. However, the effect of these are felt as a smooth and continuous distortion of the mathematically determined motion and this does not seriously effect the system dynamics. To enhance the dynamics and preserve maximum integrity of motion, the gear design is directed to those well known geometric conditions necessary for several teeth to be in contact and to promote a minimum of backlash. Also, a differential action is employed to permit the use of a continuous track cam which is always in engagement with a given roller to integrate worm reciprocation with worm rotation in such a way that desirable angular acceleration characteristics of the output gear is realized.

To provide a dwell in the motion of the driven turret, the cam is simply provided with a rise in the form of a constant lead equal to the lead of the driving worm. Thus, with rotation of the worm, the cam causes a "backing out" of the worm thread from the gear at the same rate as the threads would attempt to drive the gear. In other words, the screw is turned uniformly but at the same time moved axially backward by the cam, resulting in an irregular turning of the worm wheel and thus the driven turret. It is clear that with this form of screw drive there is an occasional pause in the motion of the turntable. If the axial movement of the worm corresponds to the pitch of the worm and moves in the opposite direction the worm wheel will remain stationary. As a result of this combination of movements, the gear or worm wheel and thus the work supporting turntable stands still. At the ends of this portion of the cam throw, a mathematically determined curve is blended which results in a smooth acceleration and deceleration of the driven gear. Usually, this curve is designed to provide zero acceleration at the start and finish of gear motion in order to minimize the dynamic effect on the driven system and, thereby, promote the greatest finesse of motion.

In view of the above conditions which prevail in the art, one of the objects of the present invention is to provide means for producing from a continuous rotary motion a desired intermittent motion or index wherein the exchange is accomplished in a smooth, continuous, and positive manner.

Another object is to provide a means for producing, from a continuous rotary motion, a desired intermittent motion or index, said means being simple, economical, and requiring a minimum of maintenance.

A further object is to provide means for producing intermittent motion, said means having versatility with respect to the motional cycle whereby various desired types of intermittent motion may be produced by a change in the shape of the cam groove.

Still another object is to provide a mechanism for producing intermittent motion from continuous rotary motion comprising a continuously rotating element and cam means for simultaneously superimposing thereon a motion of translation.

In accordance with these objects, and as a feature of this invention, there is provided an indexing mechanism wherein noise of operation, cost of maintenance, and necessary adjustments are kept to a minimum through the use of a worm and worm wheel or a helical gear in combination with a continuous single track cam which positively engages its follower at all times, said worm wheel or helical gear integrating the rotary and reciprocal motion of the worm. This combination allows, without a great deal of expense, an index which has an accuracy controlled primarily by the accuracy of the gear and worm mesh as well as a versatility of motion limited solely by the intelligence which can be introduced into the cam. The cam may be manufactured without great cost to commercial tolerance without undesirable degradation of the output motion. By using a cam with a single continuous groove in which the follower is in constant engagement, it is possible to have positive control of the resultant intermittent motion during deceleration as well as acceleration and dwell, thus eliminating discontinuities in motion caused by sudden engagement and exchange of load from one cam roll to another. The use of the worm and worm wheel or helical gear further contributes to the elimination of motion distortion due to load exchange by designing to have two to three teeth of the worm wheel or helical gear in engagement with the worm at all times and thus assuring more positive and quiet control.

The mechanism also includes a compensating mechanism which absorbs the kinetic energy of the intermittent motion producing means, the indexed turret, and its load instead of feeding this energy back through the system and requiring the motor to act as a brake. This particular mechanism not only absorbs the kinetic energy but further stores the energy and feeds it back to the mechanism at a predetermined time lessening the load on the motor during acceleration of the turret and its load. The compensating mechanism thus does a great deal toward allowing the external power source to run at a constant speed assuring greater accuracy of index and greatly improved dynamics of motion.

The use of the compensating system, absorbing a great deal of operational strain, allows the driving mechanism to be made with parts requiring less strength and thus less bulk resulting in less inertia and lower cost.

The above and other features of the invention including various novel details of construction and combinations of parts will now be more particularly described with reference to the accompanying drawings and pointed out in the claims.

Figure 1:
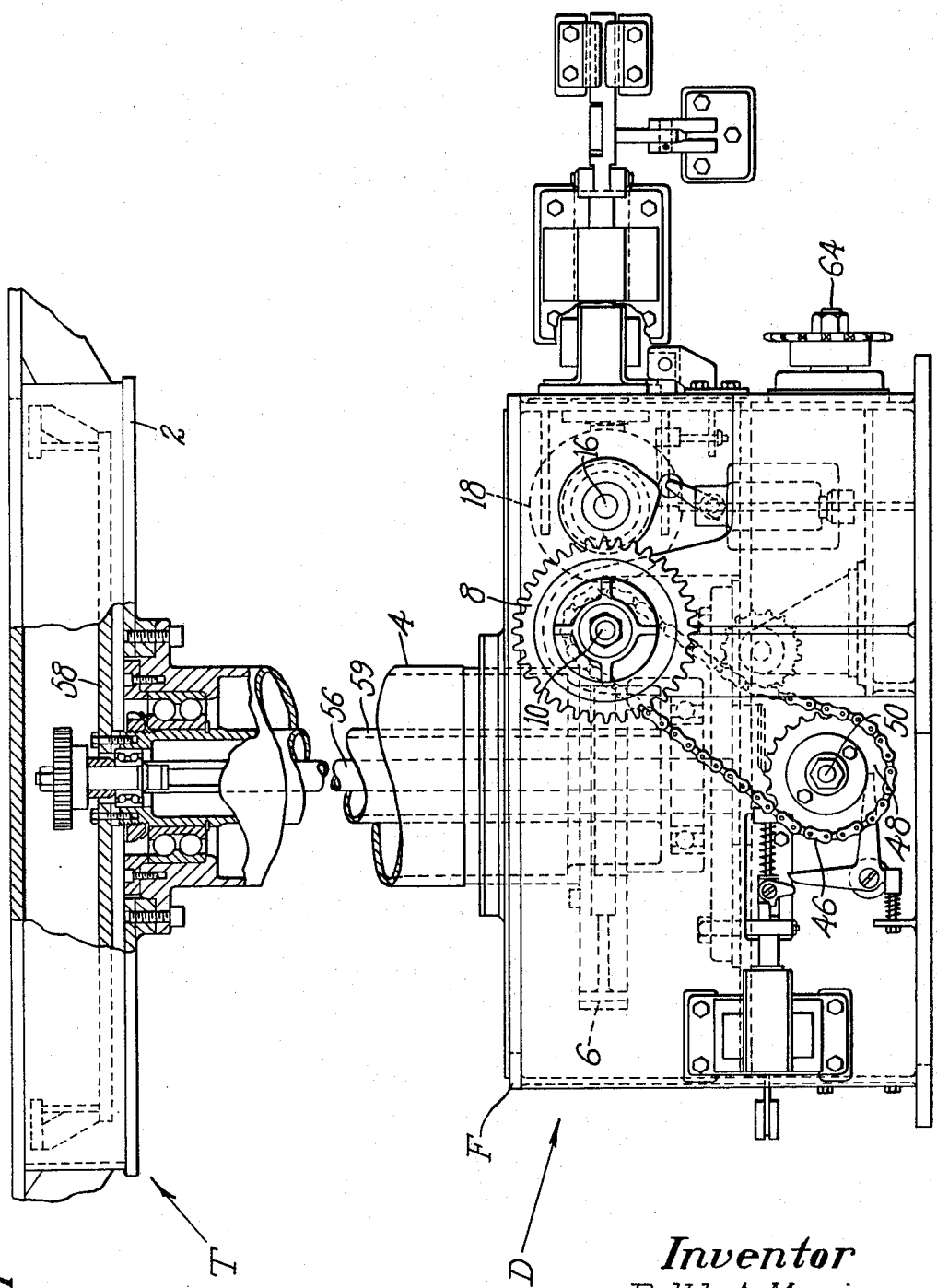
FIG. 1 is a side view partially broken away and shown in section of an illustrative machine embodying the invention.

Referring to FIG. 1, there will be seen a turret T, located above a drive mechanism D, enclosed in a frame F. The drive mechanism is set in motion by an external power source not shown. The motion of element 2, which is the exterior portion of turret T, is provided by a hollow shaft 4 directly connected with a worm wheel or helical gear 6 in the drive mechanism D. The worm wheel and helical gear are fully equivalent, each having individual characteristics which may make one more desirable than the other in a given application.

Figure 2:
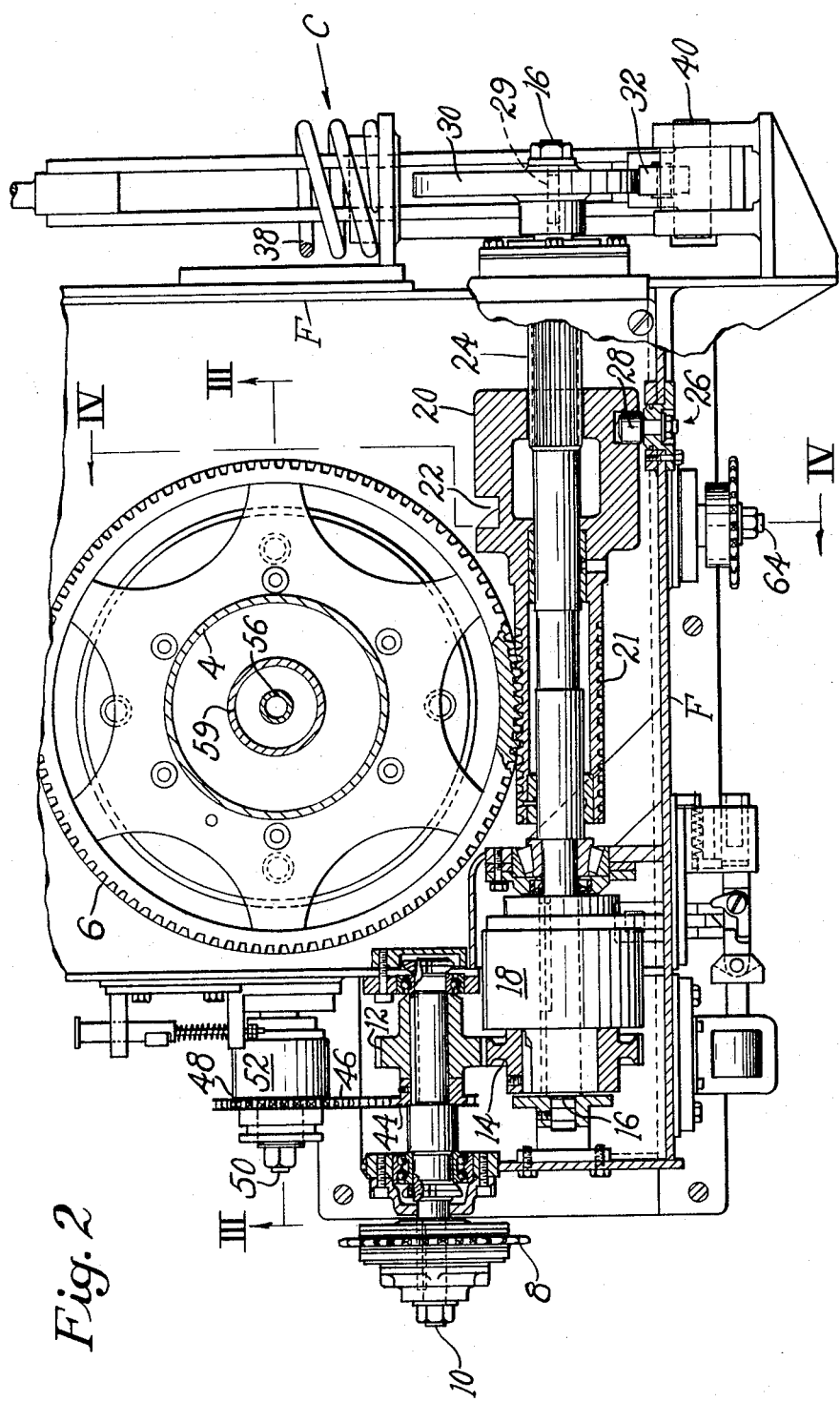
FIG. 2 is a plan view partly in section of the machine shown in FIG. 1.

The mechanism which provides intermittent motion to the turret T by means of the worm wheel or helical gear 6 can best be seen and described with reference to FIG. 2. A pulley 8 receives continuous rotary motion from an external power source (not shown) and transmits the same by means of an input shaft 10, properly supported by appropriate bearings, to a gear train 12, 14. The gear train 12, 14 transmits the continuous rotary motion of input shaft 10 to the main shaft 16 which may include a clutch mechanism 18 as an optional feature. The main shaft 16, supported by appropriate bearings, extends through the frame F of the drive mechanism D to a compensating mechanism C, later to be described in detail.

Figure 6:
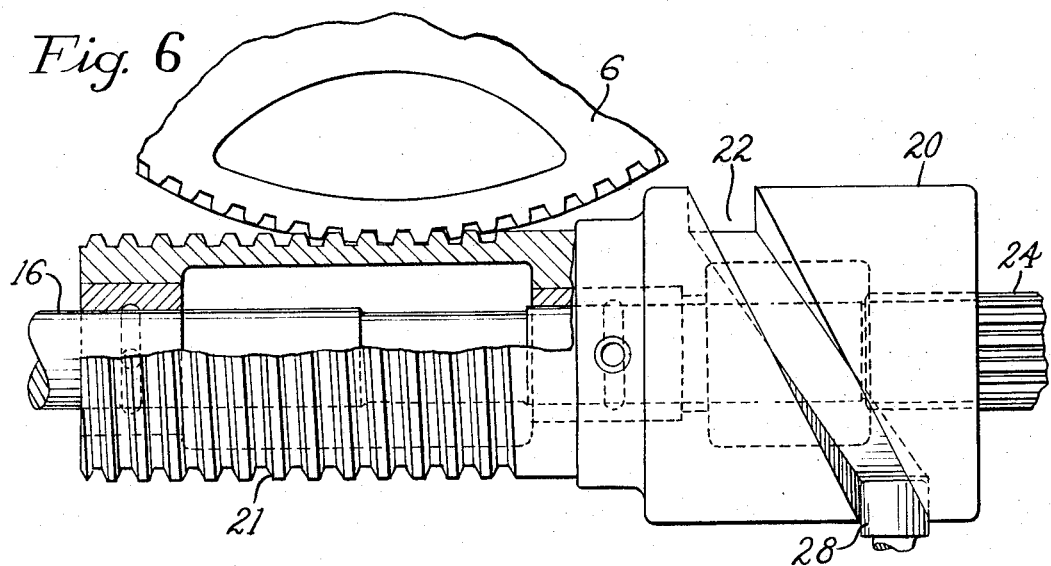
FIG. 6 is an enlarged view partly in section of the worm, barrel-cam and worm wheel or helical gear, the cam and worm wheel at their left-hand position.
Figure 7:
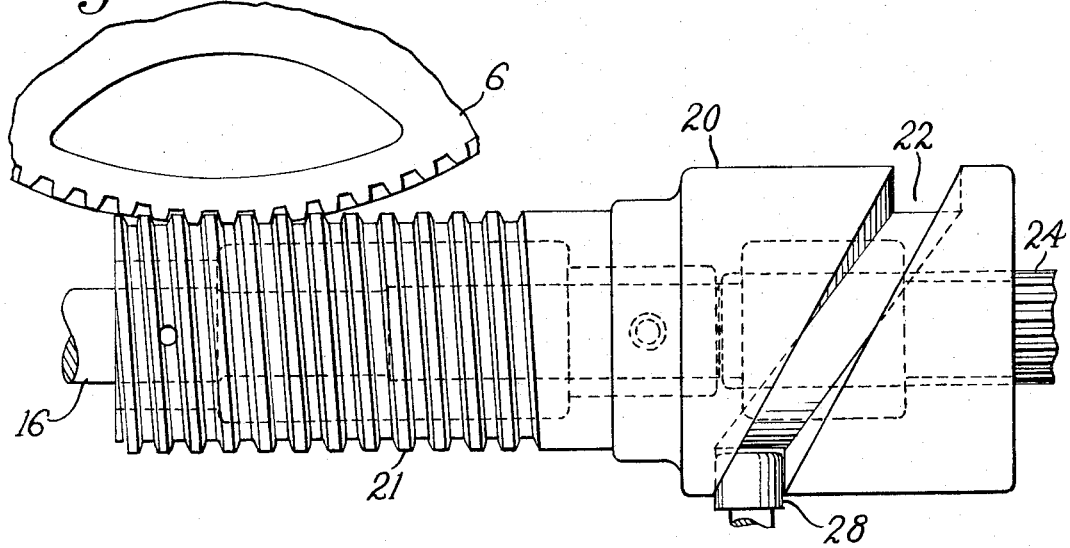
FIG. 7 is an enlarged view partly in section of the worm, barrel-cam and worm wheel or helical gear, the cam and worm wheel at their right-hand position.

The mechanism which converts the continuous rotary motion of the main shaft 16 to intermittent motion comprises a unitary cam and worm 20, 21 slidably mounted on the main shaft 16 such that it will rotate with the shaft while simultaneously moving axially along the shaft. The specific mechanism generating the axial motion, best seen in FIGS. 6 and 7, includes the interaction between the cam 20, the cam groove 22, a spline 24 located on the shaft 16 and the cam follower 26 equipped with a roller 28 and rigidly attached to the frame F. As the shaft 16 rotates, the spline 24 which can, in some cases, employ ball spline construction, causes the cam and worm 20, 21 to rotate, the cam follower 26 has its roller 28 in continual contact with the cam groove 22 and thus the shape or intelligence of the cam groove positively determines the reciprocal motion of the cam and worm.

The worm 21 acts directly upon the worm wheel or helical gear 6, two or three teeth of the worm wheel or helical gear being in engagement with the worm at all times. If the worm 21 were to remain axially stationary upon the shaft, and only rotated with the shaft, continual rotation would be transferred to the worm wheel or helical gear at a predetermined reduction ratio. The addition of reciprocal axial motion to the worm 21 accomplishes two opposite but related functions. When the worm is axially moving in the same direction as the worm pitch, the worm wheel or helical gear 6 will rotate at an angular velocity greater than that resulting from the rotation of the worm alone. During the return of the worm, i.e., when the axial movement of the worm is opposite the worm pitch, the worm wheel or helical gear will rotate at an angular velocity less than that achieved without axial movement of the worm. Depending upon the intelligence imparted to the cam, the worm wheel or helical gear will rotate, alternating between fast and slow angular velocity or between angular velocity and a stop or dwell. Since it is desired in the illustrative machine to have the turret T dwell at several work stations while the material carried by turret T is worked upon, such motion is built into the cam by means of a predetermined cam groove and assisted by clutch 18, an optional feature.

Figure 8:
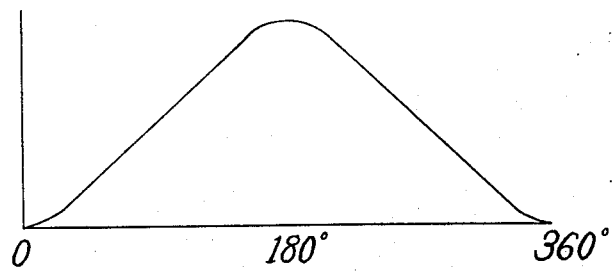
FIG. 8 is a graphic view of the reciprocating motion of the barrel-cam and worm used in the illustrative machine.

FIG. 8 is a graphical representation denoting the motion of the barrel-cam and worm combination in relation to the rotation of the main shaft 16. When the barrel-cam and worm combination 20, 21 are at the position indicated in FIG. 6, the left-hand position, the degree of rotation is indicated on FIG. 8 as 0°. As the shaft 16 rotates through 180°, the barrel-cam and worm combination 20, 21 will move to the right-hand position shown in FIG. 7 (the maximum distance D as indicated in FIG. 8). Continued rotation of shaft 16 in the same direction will return the barrel-cam and worm combination 20, 21 to that position shown in FIG. 6 beginning another cycle. As the shaft 16 rotates it will impart by means of the barrel-cam and worm combination 20, 21, worm wheel or helical gear 6 an acceleration to the worm wheel or helical gear 6 with maximum angular velocity imparted to the worm wheel or helical gear at 180° followed by a deceleration and a dwell of 4° or 5°. In the illustrative machine the gearing is so designed that a 60° turn of the turret is accomplished by every rotation of the cam and as the barrel-cam reaches the point of dwell the optional clutch 18 is disengaged giving any desired length of dwell to the indexed portion 2 of turret T.

Figure 5:
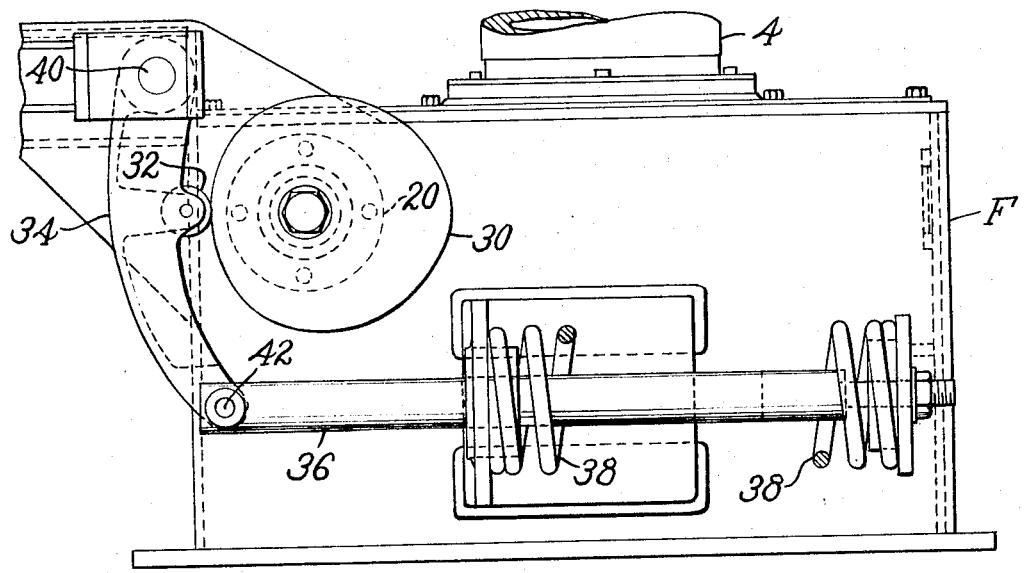
FIG. 5 is an enlarged view showing the inertia absorbing mechanism of the machine in more detail.

The compensation mechanism C which is designed to both absorb the inertia of motion during the deceleration of the turret T and to reintroduce this energy to the system during the acceleration of the turret T will now be described in detail with reference to FIG. 5. The main shaft 16 which provides the driving force for the indexing mechanism is also employed to feed inertia of motion directly to the inertia absorbing mechanism. Keyed to the main shaft 16 by key 29 is a disc cam 30 which has a predetermined specific shape. A roller 32 attached to linkage 34 which is pivotally connected to frame F at point 40 intimately follows the shape of disc cam 30 and relates this motion through pin 42 to shaft 36. Connected to shaft 36 is a spring 38 which is also attached to frame F in such a manner that the spring will contract and expand with a reciprocal motion of shaft 36. Disc cam 30 is located on the shaft 16 and has a predetermined shape so that when the motion of turret T is being arrested, the cam 30 will compress spring 38 by means of the linkage 34 and shaft 36 and during the time turret T is accelerated the potential energy of compressed spring 38 will be reintroduced to the system, again by means of the shaft 36, the linkage 34 and the cam 30. This absorption, storage and reintroduction of energy does a great deal to remove sudden strains on the exterior driving force and assures a smoother operation of the entire mechanism.

Figure 3:
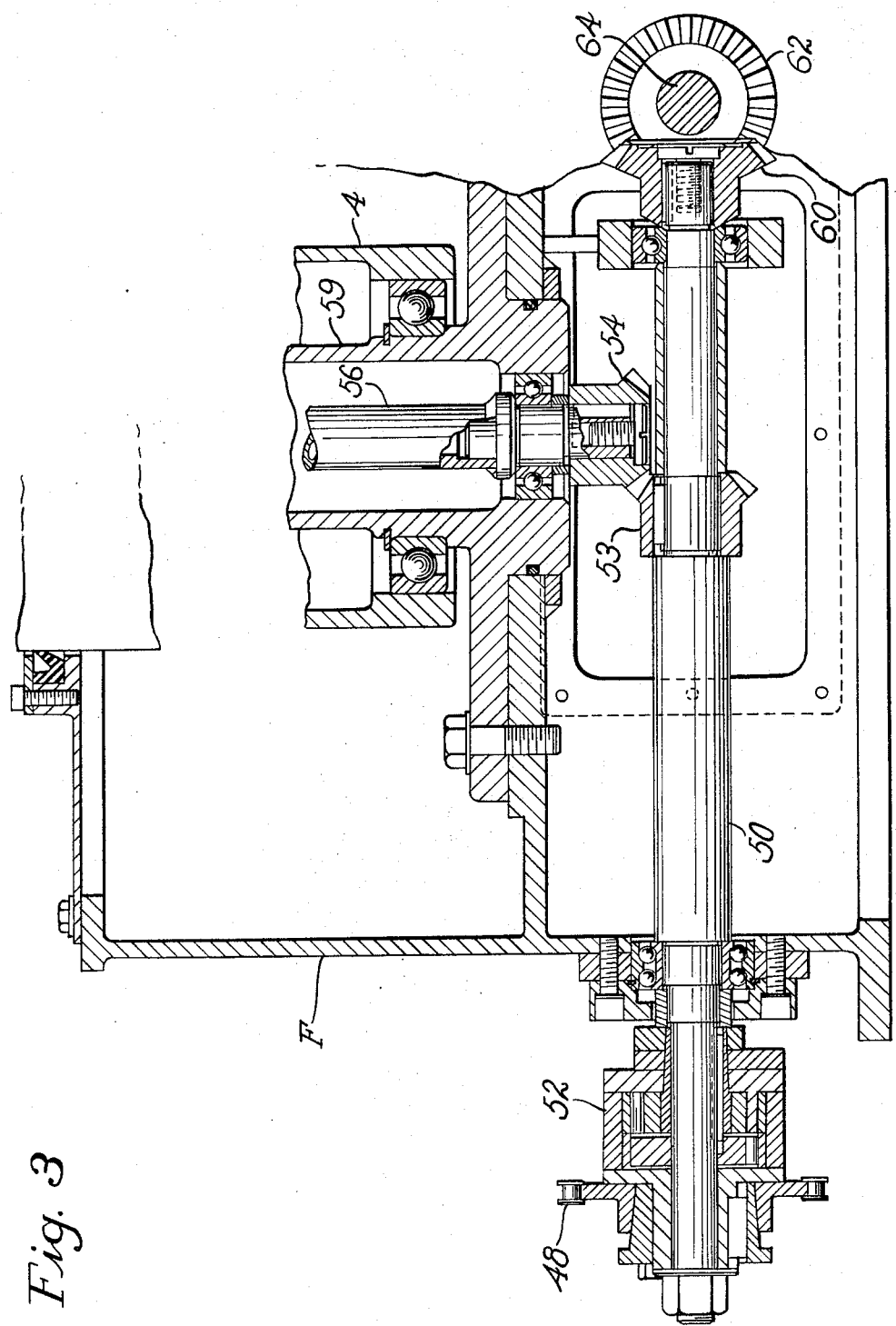
FIG. 3 is an enlarged sectional view of a part of the machine taken along lines III—III of FIG. 2.

Directly connected to input shaft 10 by a sprocket pulley 44 and a chain 46, is sprocket pulley 48 mounted on an auxiliary shaft 50. In the illustrative machine, the mounting is accomplished through an optional single revolution clutch 52 which enables disengagement of the driving means at any predetermined time. The auxiliary shaft 50 properly supported by bearings, as best seen in FIG. 3, transfers the rotary motion through gear train 53, 54 to vertical shaft 56 independently mounted within shaft 4. Shaft 56 coaxial with shafts 4 and 59 extends throughout the entire length of coaxial shafts 4 and 59 to a position above stationary table 58 mounted on stationary shaft 59, as seen in FIG. 1, providing a power take-off if required for any of the work stations about the turret T.

Figure 4:
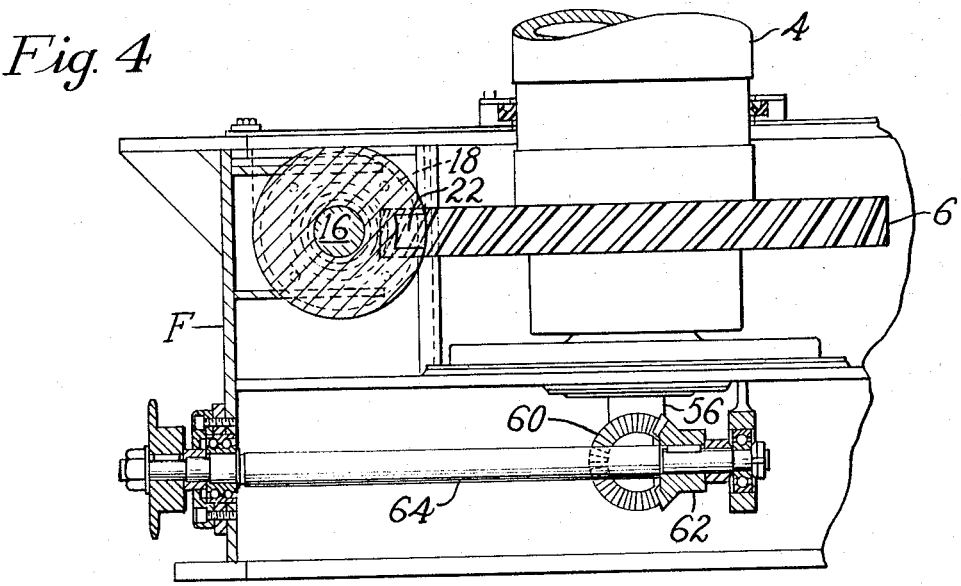
FIG. 4 is a view partly in section taken along lines IV—IV of FIG. 2.

As further seen in FIG. 3, shaft 50 extends beyond gear train 53, 54 to gear train 60, 62 which transfers the rotary motion to shaft 64, see FIG. 4, and thus through the side of frame F providing yet another power take-off.

As can be readily seen, the instant invention provides a mechanism which, although relatively inexpensive and practically maintenance-free, affords the user a great deal of versatility in both the resultant motion of the turret and use to which the mechanism can be applied.

It will be understood that the particular machine embodying the invention is shown by way of illustration only and not as a limitation of the invention. The principles and features of this invention may be employed in varied and numerous embodiments without departing from the scope of the invention.

Having thus described my invention, what I claim as new and desired to secure by Letters Patent of the United States is:

1. An intermittent motion producing means comprising a shaft, means for continuously rotating said shaft, a worm and barrel-cam combination joined for unitary movement, means mounting the worm and cam combination on the shaft for axial reciprocation while simultaneously rotating with said shaft, a stationary cam follower at all times positively engaging a continuous groove in the cam causing reciprocation of the cam and worm combination axially on the shaft when the shaft rotates, a worm wheel engaging said worm for integrating the continuous rotation and the axial reciprocation imparted to the worm, and cam and spring means operatively connected to said motion producing means to absorb the inertia of motion of the system during deceleration, store same as potential energy and redeliver said energy to said system during acceleration.

2. A device as in claim 1, wherein said inertia absorbing system comprises a second cam attached to said rotatable shaft and a spring means mounted on a second shaft and compressed by said second cam.

3. An intermittent motion producing means comprising a shaft, means for continually rotating said shaft, a worm and barrel-cam combination joined for unitary movement, means mounting the worm and cam combination on the shaft for reciprocation while simultaneously rotating with said shaft, said mounting means keying said worm and cam combination to said shaft to prevent relative rotary movement, a stationary cam follower at all times positively engaging a continuous groove in the cam causing reciprocation of the cam and worm combination axially on the shaft when the shaft rotates, a worm wheel engaging said worm for integrating the continuous rotation and axial reciprocation imparted to the worm, a work supporting turntable operatively connected to said worm wheel whereby said motion producing means rotatably imparts to the turntable an intermittent motion including dwells, a disc cam keyed to said shaft and operatively connected to a spring means to compress the spring therein at the time the turntable is approaching a dwell position, the maximum spring compression being reached at the dwell position, its potential energy returned to said turntable immediately after the dwell position is passed.

References Cited

UNITED STATES PATENTS

| 1,162,478 | 11/1915 | Grahl | 74—426 |
| 2,237,108 | 4/1941 | Nichols | 74—426 |
| 2,783,922 | 3/1957 | Vogt | 74—393 X |

FOREIGN PATENTS

| 951,806 | 4/1949 | France. |
| 450,310 | 10/1927 | Germany. |

MILTON KAUFMAN, *Primary Examiner.*

FRED C. MATTERN, *Examiner.*

D. H. THIEL, *Assistant Examiner.*